(12) United States Patent
Appelman et al.

(10) Patent No.: US 8,658,723 B2
(45) Date of Patent: Feb. 25, 2014

(54) EPOXY RESIN COMPOSITION

(75) Inventors: Eric Appelman, Dordrecht (NL); Renee-van Schijndel, Wageningen (NL); Jeffrey Thomas Carter, Cleveland (GB)

(73) Assignee: Croda International PLC, Goole, East Yorkshire (GB)

( * ) Notice: Subject to any disclaimer, the term of this patent is extended or adjusted under 35 U.S.C. 154(b) by 770 days.

(21) Appl. No.: 10/522,571

(22) PCT Filed: Jul. 17, 2003

(86) PCT No.: PCT/GB03/03109
§ 371 (c)(1),
(2), (4) Date: Aug. 29, 2005

(87) PCT Pub. No.: WO2004/011542
PCT Pub. Date: Feb. 5, 2004

(65) Prior Publication Data
US 2006/0106144 A1  May 18, 2006

(30) Foreign Application Priority Data

Jul. 31, 2002 (GB) .................................. 0217608.9

(51) Int. Cl.
*C08K 5/10* (2006.01)
*C08F 293/00* (2006.01)

(52) U.S. Cl.
USPC .......................................... 524/300; 524/438

(58) Field of Classification Search
USPC ............... 524/300, 438; 520/1; 525/438, 423, 525/433, 524, 533, 540; 528/93
See application file for complete search history.

(56) References Cited

U.S. PATENT DOCUMENTS

| | | | |
|---|---|---|---|
| 3,557,035 A | 1/1971 | Schmid et al. | |
| 3,576,903 A * | 4/1971 | Groff | ............................ 525/423 |
| 4,866,108 A | 9/1989 | Vachon et al. | |
| 4,952,645 A | 8/1990 | Mülhaupt et al. | |
| 6,242,513 B1 | 6/2001 | Zhou et al. | |
| 6,489,405 B1 | 12/2002 | Beisele | |
| 2003/0152778 A1* | 8/2003 | Parekh et al. | .............. 428/423.1 |
| 2003/0191272 A1* | 10/2003 | Flosbach et al. | ................ 528/44 |

FOREIGN PATENT DOCUMENTS

| | | |
|---|---|---|
| CA | 857993 | 12/1970 |
| EP | 0272222 | 6/1988 |
| EP | 0394887 | 10/1990 |
| EP | 1026218 | 8/2000 |
| GB | 902688 | 8/1962 |
| GB | 1001467 | 8/1965 |
| GB | 1077119 | 7/1967 |
| JP | 08-209035 | 8/1996 |
| WO | WO 03/055957 | 7/2003 |

OTHER PUBLICATIONS

Rana, Debdatta, "Modification of epoxy resins for improvement of adhesion: a critical review" *J. Adhesion Sci. Technol.*, 17:12 (2003) 1655-1668.
Search Report dated Nov. 15, 2002 for GB 0217608.9 (related priority application).

* cited by examiner

*Primary Examiner* — Peter F Godenschwager
(74) *Attorney, Agent, or Firm* — Jones Day

(57) ABSTRACT

A composition capable of phase separation contains an epoxy resin and an impact modifier formed from at least one dimer fatty acid and/or dimer fatty diol. The composition is suitable for use as an adhesive, particularly in microelectronics.

44 Claims, No Drawings

EPOXY RESIN COMPOSITION

CROSS REFERENCE TO RELATED APPLICATION

This application is the National Phase application of International Application No. PCT/GB2003/003109, filed Jul. 17, 2003, which designates the United States and was published in English. This application, in its entirety, is incorporated herein by reference.

FIELD OF THE INVENTION

The present invention relates to a composition comprising an epoxy resin and an impact modifier, and in particular to the use thereof as an adhesive.

BACKGROUND

Epoxy resins are widely used in many industrial applications. Epoxy resins have good thermal and chemical resistance, in addition to effective electrical and mechanical properties enabling their use, in particular, as an adhesive on a wide range of substrates. Epoxy resins are particularly useful in microelectronics. One such application is as a die-attach adhesive to bond a chip or die to a carrier or a circuit board. However, in some applications epoxy resins are generally too brittle, lacking the flexibility required, for example, to cope with thermal cycling. Flexibility can be imparted to an epoxy resin by incorporating an impact modifier. Suitable materials are described in U.S. Pat. No. 6,242,513-B (column 5, lines 35-62). Liquid synthetic rubbers such as functionalised polybutadiene copolymers are particularly preferred, especially in microelectronic applications. Unfortunately, the components of synthetic rubbers can be toxic, and it is preferred not to use these materials for environmental reasons. In addition, moisture uptake of an epoxy adhesive containing synthetic rubber can be a problem which can lead to thermal instability or "popcorning" of the completed electronic device. Such materials can also suffer from ionic contamination by alkali metal and chloride ions which can result in corrosion of the electrical components.

SUMMARY OF THE INVENTION

We have now surprisingly discovered an epoxy resin composition which reduces or substantially overcomes at least one of the aforementioned problems.

Accordingly, the present invention provides a composition capable of phase separation which comprises an epoxy resin and an impact modifier comprising at least one dimer fatty acid and/or dimer fatty diol.

The invention also provides a cured epoxy resin composition comprising phase separated impact modifier comprising at least one dimer fatty acid and/or dimer fatty diol.

The invention further provides a prepolymer comprising in the range from 40 to 80% by weight of epoxy resin, and 20 to 60% by weight of impact modifier, wherein the impact modifier comprises in the range from 15 to 50% by weight of at least one dimer fatty acid and/or dimer fatty diol.

The invention further provides a cured epoxy resin composition comprising impact modifier particles having an aspect ratio in the range from 0.7 to 1.3:1, and a mean particle diameter in the range from 0.8 to 5 μm.

The invention further provides the use of a composition capable of phase separation, comprising an epoxy resin and an impact modifier comprising at least one dimer fatty acid and/or dimer fatty diol as an adhesive.

The invention further provides an electronic assembly adhesive capable of phase separation comprising an epoxy resin and an impact modifier comprising at least one dimer fatty acid and/or dimer fatty diol.

The invention yet further provides a circuit board comprising a chip or die bonded by an epoxy resin adhesive comprising phase separated impact modifier comprising at least one dimer fatty acid and/or dimer fatty diol.

The invention still further provides a method of forming a composition which is capable of phase separation comprising (i) reacting an impact modifier comprising at least one dimer fatty acid and/or dimer fatty diol with a first epoxy resin to form a prepolymer, and (ii) mixing the prepolymer with a second epoxy resin, and optionally (iii) curing the composition.

The epoxy resin preferably contains more than one 1,2-epoxy group per molecule. Such epoxides are well known in the art and are described in Y. Tanaka, "Synthesis and Characteristics of Epoxides", in C. A. May, ed., Epoxy Resins Chemistry and Technology (Marcel Dekker, 1988). They can be saturated or unsaturated aliphatic, cycloaliphatic, or heterocyclic groups and can be monomeric or polymeric in nature. The weight per epoxide of such resins is preferably in the range from 100 to 2,000.

Suitable epoxy resins are the glycidyl polyethers of polyhydric phenols which are derived from an epihalohydrin, eg epichlorohydrin, and a polyhydric phenol. Examples of such polyhydric phenols include resorcinol, hydroquinone, bis(4-hydroxyphenyl)-2,2-propane ("bisphenol A") 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(2-dihydroxynaphthyl)methane, phloroglucinol, and bis(4-hydroxyphenyl)sulphone. Other polyhydric phenols include novolac resins containing more than two phenol, optionally substituted, moieties linked through methylene bridges, in addition to halogenated phenolic compounds.

Other epoxy resins include glycidyl polyethers of polyhydric alcohols prepared by reacting a polyhydric alcohol with an epihalohydrin using a Lewis acid catalyst, eg boron trifluoride, followed by treatment with an alkaline dehydrogenating agent. Suitable polyhydric alcohols include glycerine, ethylene glycol, propylene glycol, diethylene glycol, hexanediol, hexanetriol, trimethylolpropane, trimethylolethane, and pentaerythritol.

Additional epoxy resins are glycidyl esters of polycarboxylic acids derived from an epihalohydrin and a polycarboxylic acid. Suitable polycarboxylic acids include phthalic acid, phthalic anhydride, isophthalic acid, terephthalic acid, tetrahydrophthalic acid, hexahydrophthalic anhydride, adipic acid, dimerised fatty acids, and dibasic acids made from an unsaturated fatty acid and acrylic acid.

The most preferred epoxy resins are glycidyl polyethers of polyhydric phenols, particularly the glycidyl polyethers of bisphenol A, the advanced diglycidyl ethers of bisphenol-A, the diglycidyl ethers of bisphenol-F, styrene oxide, cyclohexene oxide, and the glycidyl ethers of phenol and other alkyl phenols. Diglycidyl ethers of bisphenol-A and the advanced diglycidyl ethers of bisphenol-A are particularly preferred, and especially the advanced diglycidyl ethers of bisphenol-A.

The epoxy resins preferably have a molecular weight number average in the range from 800 to 6,000, more preferably 1,000 to 3,000, particularly 1,200 to 2,000, and especially 1,400 to 1,600.

The impact modifier used in the present invention comprises and/or is formed from at least one dimer fatty acid and/or dimer fatty diol and/or equivalent thereof. The term dimer fatty acid is well known in the art and refers to the dimerisation product of mono- or polyunsaturated fatty acids and/or esters thereof. Preferred dimer fatty acids are dimers of $C_{10}$ to $C_{30}$, more preferably $C_{12}$ to $C_{24}$, particularly $C_{14}$ to $C_{22}$, and especially $C_{18}$ alkyl chains. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Particularly preferred dimer fatty acids used in the present invention, have a dicarboxylic (or dimer) content of greater than 50%, more preferably greater than 70%, particularly greater than 85%, and especially greater than 94% by weight. The trimer content is preferably less than 50%, more preferably in the range from 1 to 20%, particularly 2 to 10%, and especially 3 to 6% by weight. The monomer content is preferably less than 5%, more preferably in the range from 0.1 to 3%, particularly 0.3 to 2%, and especially 0.5 to 1% by weight.

Dimer fatty diols can be produced by hydrogenation of the corresponding dimer fatty acid. The same preferences above for the dimer fatty acid apply to the corresponding dimer fatty diol component of the impact modifier.

The impact modifier is preferably an oligomer or polymer (hereinafter referred to as a polymer) formed from, ie comprises reaction residues of, at least one dimer fatty acid and/or dimer fatty diol and/or equivalent thereof. Suitable polymers include polyesters, polyamides, polyesteramides and polyurethanes. The function of the impact modifier is to increase the flexibility and/or toughness of the epoxy resin composition.

The molecular weight (number average) of the impact modifier is preferably in the range from 200 to 30,000, more preferably 600 to 20,000, particularly 800 to 15,000, and especially 1,000 to 10,000.

In one preferred embodiment of the present invention, the impact modifier comprises an oligoester or polyester. Polyester is normally produced in a condensation reaction between at least one polycarboxylic acid and at least one polyol. Dicarboxylic acids and diols are preferred. The preferred dicarboxylic acid component of the polyester impact modifier used in the present invention preferably comprises at least one dimer fatty acid, as described above.

The dicarboxylic acid component of the polyester impact modifier preferably also comprises non-dimeric fatty acids. The non-dimeric fatty acids may be aliphatic or aromatic, and include dicarboxylic acids and the esters, preferably alkyl esters, thereof, preferably linear dicarboxylic acids having terminal carboxyl groups having a carbon chain in the range from 2 to 20, more preferably 6 to 12 carbon atoms, such as adipic acid, glutaric acid, succinic acid, pimelic acid, suberic acid, azelaic acid, sebacic acid, heptane dicarboxylic acid, octane dicarboxylic acid, nonane dicarboxylic acid, decane dicarboxylic acid, undecane dicarboxylic acid, dodecane dicarboxylic acid and higher homologs thereof. Adipic acid is particularly preferred.

A monomeric dicarboxylic acid anhydride, such as phthalic anhydride, may also be employed as the or as part of the non-dimeric acid component.

The polyester is preferably formed from dimer fatty acids to non-dimer fatty acids present at a ratio in the range from 10 to 100%:0 to 90%, more preferably 30 to 70%:30 to 70%, particularly 40 to 60%:40 to 60%, and especially 45 to 55%:45 to 55% by weight of the total dicarboxylic acids.

The polyol component of the polyester is suitably of low molecular weight, preferably in the range from 50 to 650, more preferably 70 to 200, and particularly 100 to 150. The polyol component may comprise polyols such as pentaerythritol, triols such as glycerol and trimethylolpropane, and preferably diols. Suitable diols include straight chain aliphatic diols such as ethylene glycol, diethylene glycol, 1,3-propylene glycol, dipropylene glycol, 1,4-butylene glycol, 1,6-hexylene glycol, branched diols such as neopentyl glycol, 3-methyl pentane glycol, 1,2-propylene glycol, and cyclic diols such as 1,4-bis(hydroxymethyl)cyclohexane and (1,4-cyclohexane-dimethanol). 1,4-butylene glycol, 1,6-hexylene glycol and neopentyl glycol are preferred diols.

The polyol component may also comprise a dimer fatty diol as described above. The same preferences above for the dimer fatty acid apply to the corresponding dimer fatty diol component of the polyester.

The polyester impact modifier is preferably formed from dicarboxylic acid to diol starting materials at a molar ratio in the range from 1.0 to 5.0:1, more preferably 1.1 to 3.0:1, particularly 1.15 to 2.0:1, and especially 1.2 to 1.5:1. Thus, the dicarboxylic acid is preferably present in molar excess so as to obtain a polyester terminated at both ends with acid groups.

In a preferred embodiment, the polyester is formed from dimer fatty acid, adipic acid, and at least one diol having a molecular weight in the range from 50 to 650, preferably at a molar ratio in the range from 0.1 to 1:0.3 to 2:1, more preferably 0.15 to 0.6:0.6 to 1.6:1, particularly 0.2 to 0.4:0.8 to 1.3:1, and especially 0.25 to 0.3:1 to 1.1:1.

The polyester preferably has a molecular weight (number average) in the range from 800 to 6,000, more preferably 900 to 3,000, particularly 1,000 to 2,000, and especially 1,100 to 1,400.

The polyester preferably has a glass transition temperature (Tg) in the range from −60 to 0° C., more preferably −50 to −5° C., particularly −40 to −10° C., and especially −35 to −15° C.

The polyester preferably has an acid value (measured as described herein) in the range from 10 to 140, more preferably 35 to 125, particularly 55 to 110, and especially 80 to 100 mgKOH/g. In addition, the polyester preferably has a hydroxyl value (measured as described herein) of less than 2, more preferably less than 1.5, particularly less than 1.0, and especially less than 0.6.

In an alternative embodiment of the present invention, the impact modifier comprises an oligoamide or polyamide. Polyamide is normally produced in a condensation reaction between a dicarboxylic acid and a diamine. The preferred dicarboxylic acid component of the polyamide impact modifier used in the present invention comprises at least one dimer fatty acid as described above. In addition, non-dimer fatty acids may also be employed.

Suitable non-dimer fatty acids may be aliphatic or aromatic, and include dicarboxylic acids and the esters, preferably alkyl esters, thereof, preferably linear dicarboxylic acids having terminal carboxyl groups having a carbon chain of from 2 to 20, more preferably 6 to 12 carbon atoms, such as adipic acid, pimelic acid, suberic acid, azelaic acid, sebacic acid, heptane dicarboxylic acid, octane dicarboxylic acid, nonane dicarcoxylic acid, decane dicarboxylic acid, undecane dicarboxylic acid, dodecane dicarboxylic acid and higher homologs thereof.

The polyamide impact modifier is preferably formed from dimer fatty acids to non-dimer fatty acids present at a ratio of from 10 to 100%:0 to 90%, more preferably 50 to 100%:0 to 50%, particularly 80 to 100%:0 to 20%, and especially 95 to 100%:0 to 5% by weight of the total dicarboxylic acids.

Suitable diamines include amine-equivalents of the aforementioned dicarboxylic acids, but generally shorter chain materials are preferred, particularly those containing from 2 to 7 carbon atoms. Diamines such as ethylenediamine, propylenediamine, tetramethylenediamine, pentamethylenediamine, hexamethylenediamine, as well as dimer fatty diamines (derived from dimer fatty acids) are preferred. Suitable aromatic diamines include materials derived from benzene, toluene and other substituted aromatic materials, such as 2,6-tolylenediamine, 4,4-diphenylmethanediamine and xylylenediamine. Other suitable diamines include those which contain one or two secondary amino groups, and heterocyclic diamines, for example piperazine. Branched diamines, such as 3-methyl pentane diamine may also be used. 4,4-diaminophenylsulphone is a particularly preferred diamine.

The weight ratio of dicarboxylic acid to diamine starting materials used to form the polyamide impact modifier is preferably in the range from 1.0 to 5.0:1, more preferably 1.05 to 3.0:1, particularly 1.1 to 2.0:1, and especially 1.2 to 1.4:1. The polyamide is preferably carboxy terminated at both ends, particularly by dimer fatty acids as described herein.

The polyamide preferably has a molecular weight (number average) in the range from 700 to 30,000, more preferably 800 to 15,000, particularly 900 to 10,000, and especially 1,000 to 6,000.

The polyamide preferably has a softening point in the range from 40 to 200° C., more preferably 45 to 125° C., particularly 50 to 100° C., and especially 55 to 85° C.

The polyamide preferably has an acid value (measured as described herein) in the range of from 20 to 200, more preferably 40 to 100, particularly 50 to 70, and especially 60 to 65 mgKOH/g. In addition, the polyamide preferably has an amine value (measured as described herein) of less than 10, more preferably less than 5, particularly less than 3, and especially less than 1 mgKOH/g.

The impact modifier may also be a copolymer, block, random or graft, of polyester and polyamide, at least one, and preferably both, thereof as defined above. In one preferred embodiment the impact modifier is a copolymer, more preferably random, comprising polyester to polyamide present at a ratio in the range from 10 to 95%:5 to 90%, more preferably 40 to 90%:10 to 60%, particularly 60 to 80%:20 to 40%, and especially 67 to 73%:27 to 33% by weight of the copolymer.

Alternatively, the impact modifier may be a polyurethane, for example formed from one or more of the aforementioned polyesters, and/or formed by using at least one dimer fatty acid and/or dimer fatty diol as a chain extender.

The impact modifier preferably comprises in the range from 10 to 70%, more preferably 15 to 50%, particularly 20 to 30%, and especially 23 to 27% by weight of residues of dimer fatty acid and/or dimer fatty diol and/or equivalent thereof.

The weight ratio of epoxy resin:impact modifier present in the composition is preferably in the range from 1 to 20:1 more preferably 1.5 to 10:1, particularly 2 to 4:1, and especially 2.4 to 2.8:1.

In a preferred embodiment of the invention, the impact modifier is reacted with an epoxy resin to form a prepolymer, prior to formation of a composition according to the present invention. These epoxy resins preferably have a molecular weight number average in the range from 200 to 3000, more preferably 220 to 1,000, particularly 230 to 500, and especially 240 to 280. The molecular weight of the epoxy resin used to form the prepolymer is preferably less than the molecular weight of the epoxy resin which is mixed with the prepolymer to form the composition according to the present invention.

Particularly useful epoxy resins for forming the prepolymer include the diglycidyl ethers of bisphenol-A, the advanced diglycidyl ethers of bisphenol-A, the diglycidyl ethers of bisphenol-F, styrene oxide, cyclohexene oxide, and the glycidyl ethers of phenol and other alkyl phenols. Diglycidyl ethers of bisphenol-A are particularly preferred. A chain extender such as bisphenol A, and/or bisphenol F is also preferably used to form the prepolymer.

A catalyst may also be employed, preferably one or more of the normal epoxy resin catalysts, such as paratoluene sulphonic acid (PTSA), ethyl triphenyl phosphonium iodide (ETPI), triphenylphosphine (TPP), and tetrabutyl phosphonium acid acetate (TBPAA).

The prepolymer preferably has a molecular weight (number average) in the range from 10,000 to 80,000, more preferably 15,000 to 50,000, particularly 20,000 to 40,000, and especially 25,000 to 35,000.

The prepolymer preferably comprises in the range from 0.5 to 50%, more preferably 3 to 25%, particularly 7 to 15%, and especially 10 to 13% by weight of residues of dimer fatty acid and/or dimer fatty diol and/or equivalent thereof.

The prepolymer preferably comprises in the range from 10 to 80%, more preferably 20 to 60%, particularly 30 to 50%, and especially 40 to 45% by weight of impact modifier. The prepolymer also preferably comprises in the range from 20 to 90%, more preferably 40 to 80%, particularly 50 to 70%, and especially 55 to 60% by weight of epoxy resin.

The weight ratio of epoxy resin:impact modifier present in the prepolymer is preferably in the range from 0.25 to 4:1, more preferably 0.75 to 2:1, particularly 1 to 1.6:1, and especially 1.2 to 1.4:1.

The composition according to the present invention preferably comprises in the range from 1 to 40%, more preferably 4 to 20%, particularly 6 to 12%, and especially 8 to 9% by weight of residues of dimer fatty acid and/or dimer fatty diol and/or equivalent thereof.

The composition preferably comprises in the range from 3 to 90%, more preferably 10 to 50%, particularly 20 to 35%, and especially 25 to 30% by weight of impact modifier.

In addition, the composition preferably comprises in the range from 10 to 97%, more preferably 50 to 90%, particularly 65 to 80%, and especially 70 to 75% by weight of epoxy resin. The aforementioned ranges include any epoxy resin originally present in the prepolymer.

The composition according to the present invention is suitably formed by mixing the epoxy resin and impact modifier, preferably in the form of the prepolymer.

The composition preferably comprises a suitable catalyst, such as those known in the art for epoxy resins, for example one of the catalysts described above.

The composition may also comprise, other optional components such as fillers, for example fumed silica, silver flake; and curing agents such as phenolic novolac resins.

The composition according to the invention may be applied as a film on a suitable substrate, and excess solvent removed by heating in an oven, for example at a temperature of less than 100° C. Hot air may be blown through the oven in order to remove the solvent. The composition can be stored as a dry film prior to use, preferably having a thickness in the range from 10 to 300 μm, more preferably 25 to 150 μm, and particularly 50 to 75 μm. The film can be subsequently cured in situ by heating, for example, at a temperature in the range from 125 to 175° C.

Alternatively, the composition may be applied in situ as a free flowing viscous solid, and cured directly by heating as described above.

The composition preferably has an Interfacial Work of Adhesion, Ga (measured as described herein) of greater than 50, more preferably greater than 70, particularly greater than 90, and especially greater than 110 and up to 150 $Jm^{-2}$. The composition preferably has the aforementioned values when maintained under dry conditions, but more preferably, also when conditioned at 85° C./85% relative humidity for 168 hours (known as JEDEC 1). A particular surprising feature of a composition according to the present invention is that the Ga values are effectively maintained under moist conditions. Thus, the Ga value of the composition after conditioning under JEDEC 1 conditions is preferably at least 50%, more preferably at least 70%, particularly at least 90%, and especially 100% of the value obtained prior to conditioning (ie maintained under dry conditions).

The composition preferably has an Essential Work of Fracture (measured as described herein) of greater than 9, more preferably in the range from 10 to 20, particularly 12 to 18, and especially 14 to 16 $kJm^{-2}$.

A particular advantage of compositions according to the present invention, is that on curing, phase separation of the impact modifier can occur resulting in the formation of domains or particles of impact modifier within an epoxy resin matrix.

The impact modifier particles are preferably approximately spherical, suitably having a mean aspect ratio $d_1:d_2$ (where $d_1$ and $d_2$, respectively, are the length and width of the particle (measured as described herein)) in the range from 0.6 to 1.4:1, preferably 0.7 to 1.3:1, more preferably 0.8 to 1.2:1, particularly 0.9 to 1.1:1, and especially 0.95 to 1.05:1. In a preferred embodiment of the invention, suitably at least 40%, preferably at least 55%, more preferably at least 70%, particularly at least 80%, and especially at least 90% by number of particles have an aspect ratio within the above preferred ranges given for the mean aspect ratio.

The impact modifier particles preferably have a mean particle diameter (measured as described herein) in the range from 0.4 to 7 μm, more preferably 0.8 to 5 μm, particularly 1.2 to 3 μm, and especially 1.5 to 2.5 μm.

The size distribution of the impact modifier particles can also have a significant effect on the final properties of, for example, a cured epoxy resin composition according to the present invention. In a preferred embodiment of the invention, suitably at least 50%, preferably at least 60%, more preferably at least 70%, particularly at least 80%, and especially at least 85% by number of particles have a particle diameter within the above preferred ranges given for the mean particle diameter.

In addition, the impact modifier particles preferably have less than 25%, more preferably less 20%, particularly less than 15%, and especially less than 10% by number of particles having a particle diameter of less than 0.5 μm. The impact modifier particles also preferably have less than 20%, more preferably less 15%, particularly less than 10%, and especially less than 5% by number of particles having a particle diameter of greater than 5 μm.

The composition described herein is suitable for use, preferably as an adhesive, particularly as an electronic assembly adhesive, for example in electrical and microelectronic applications. The composition may be used in microelectronics manufacturing such as in encapsulation, potting, thin-film coating and embedding of electronic circuits. The composition is particularly suitable for use as a die-attach adhesive to bond a chip or die to a carrier or a circuit board.

The composition may also be used in glass fibre sizing, in automotive applications, such as in under the hood applications, in electronics, for example as encapsulates and potting adhesives.

In this specification the following test methods have been employed:

(i) Molecular weight number average was determined by Gel Permeation Chromatography (GPC).

(ii) The softening point and glass transition temperature (Tg) were measured by Differential Scanning Calorimetry (DSC) at a scan rate of 20° C./minute using a Mettler DSC30.

(iii) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

(iv) The acid value is defined as the number of mg of potassium hydroxide required to neutralise the free fatty acids in 1 g of sample, and was measured by direct titration with a standard potassium hydroxide solution.

(v) The amine value is defined as the number of mg of potassium hydroxide per 1 g of sample, and was measured by direct titration with a standard potassium hydroxide solution, followed by titration with hydrochloric acid using bromophenol blue as an indicator.

(vi) Particle Size of the impact modifier particles was determined by immersing a cured epoxy resin sample in liquid nitrogen, preparing thin sections by microtoning, and performing scanning electron microscopy. Photographs were produced at an appropriate magnification, such that about 50 impact modifier particles were displayed in each photograph. A minimum number of 300 particles were sized manually using a transparent size grid. The mean particle diameter, and particle size distribution, of the particles were calculated from the above measurements. In addition, the aspect ratio of the particles was determined from the maximum and minimum dimensions of at least 50 particles. Alternatively, the measurements could be performed by computerised image analysis.

(vii) Substrate adhesion was measured using T Peel Testing. T-Peel specimens were constructed as laminates containing a film of uncured adhesive of thickness 0.2 to 1 mm, between strips of thin copper foil of thickness 150 to 200 μm. The samples were cured for 1 hour at 175° C. prior to testing. During the test, the copper strips were pulled apart whist recording load, peel deflection and peel angles. Using knowledge of the tensile properties of the copper peel arms, the recorded data can be analysed to obtain the Interfacial Work of Adhesion, Ga (in $Jm^{-2}$). Specimens were tested dry and after conditioning at 85° C./85% relative humidity for 168 hours (known as JEDEC 1).

(viii) Cohesive properties of cured films (prepared as described in Example 1) were determined by measuring the so-called "Essential Work of Fracture" (European Structural Integrity Society (ESIS) Technical Committee 4 (TC4)) Protocol for Elastic-Plastic fracture mechanics approach using films). Essential Work was performed in tension on double edge notched specimens with varying ligament lengths, cut from cured thin films of thickness 150 μm. The resultant force/deflection data was analysed to obtain the Essential Work of Fracture (in $kJm^{-2}$).

The invention is illustrated by the following non-limiting example.

Example 1 i) Prepolymer Formation 54.5 g of impact modifier (polyester having a molecular weight of 1200, made from Pripol 1017 (dimer fatty acid) (trade mark, ex Uniqema)/adipic acid (50/50 by weight/neopentyl glycol)) and 49.9 g of epoxy resin (diglycidyl ether of bisphenol-A having a molecular weight of 260) were charged to a round bottomed flask fitted with an air driven stirrer, nitrogen inlet and condenser. The oil bath was heated to 95° C., and 0.06 g of catalyst added. The reaction was then held at 95° C. for 15 minutes, after which time the reaction temperature was increased to 145° C. A further 0.08 g of catalyst was added, followed by 5.6 g of bisphenol A. Three further 5.6 g portions of bisphenol A were added every 5 minutes. The reaction was then held at 145° C. until the viscosity of the reaction increased significantly (approximately 30 minutes). The reaction was quenched by adding approximately 75 ml of MEK (methylethyl ketone), and the reaction temperature was reduced to 83° C. and held at this temperature for approximately 60 minutes. After this time, the heat was switched off and the reaction allowed to cool to room temperature. The prepolymer solution was then poured into a tray made from mould release paper and allowed to stand in a fume cupboard to allow the majority of the MEK to evaporate. The remaining MEK was removed under vacuum at approximately 90° C., and the prepolymer cooled and stored in a freezer until required.

The resultant prepolymer had an impact modifier content of 42.9% by weight, and an epoxy resin content of 57.1% by weight. The prepolymer contained 11% by weight of residues of dimer fatty acid.

ii) Epoxy Resin Composition Formation 39.7 g of the prepolymer formed above, 15.1 g of epoxy resin (diglycidyl ether of bisphenol-A having a molecular weight of 1,500), 4.4 g of a phenolic novolac resin, and 0.88 g catalyst were weighed into a 500 ml jar and 150 ml MEK was added. A magnetic bar was also added, and the mixture stirred until complete dissolution of all components had been achieved. The resin solution was poured into a tray prepared from mould release paper, and the MEK allowed to evaporate in a fume cupboard overnight. The remaining MEK was removed under vacuum at about 90° C. for no longer than 20 minutes.

The resultant composition had an impact modifier content of 28.3% by weight, a prepolymer content of 66.3% by weight, and contained 7% by weight of residues of dimer fatty acid.

iii) Film Formation

Small amounts of the MEK free compositions produced above were compression moulded between two sheets of mould release paper in order to form films of thickness 150 µm. To produce uncured films, compression was carried out at 60° C. using a pressure of 10 tonnes between two 12" platens (Moore Press). In order to produce cured film, the uncured films produced above were heated from room temperature to 175° C. over a period of 30 minutes using a pressure of about 3-5 tonnes. The films were maintained at 175° C. for 60 minutes and then allowed to cool.

The materials were subjected to the test procedures described herein and exhibited the following properties;

(i) Mean particle size of the impact modifier=1 µm.
(ii) Interfacial Work of Adhesion, Ga=100 Jm$^{-2}$ (dry), and 100 Jm$^{-2}$ (JEDEC 1).
(iii) Essential Work of Fracture=15 kJm$^{-2}$.

The above example illustrates the improved properties of an epoxy resin composition according to the present invention.

The invention claimed is:

1. A heat-curable epoxy resin composition, comprising:
   a) a glycidyl epoxy resin; and
   b) an impact modifier that is selected from the group consisting of: a polyesteramide, a copolymer formed from a polyester and polyamide, a polyurethane, or a polyurethane formed from a polyester;
   wherein:
   i) the ester-containing portion of the impact modifier consists of:
      1) a residue from a dimer fatty diol; or at least one acid residue selected from the group consisting of: a dimer fatty acid and a non-dimeric fatty acid; and
      2) at least one diol residue selected from the group consisting of: a polyol having molecular weight of between 50 and 200 and a dimer fatty diol;
      provided that the ester-containing portion of the impact modifier contains a residue from at least one of the following: the dimer fatty acid, the dimer fatty diol, or both;
   ii) the composition phase separates upon curing to form phase-separated domains and/or particles comprising the impact modifier; and
   iii) the weight ratio of epoxy resin:impact modifier is in the range from 1.5 to 20:1.

2. The composition of claim 1, wherein the impact modifier is a polyester.

3. The composition of claim 1, wherein the impact modifier is a polyesteramide.

4. The composition of claim 1, wherein the impact modifier is a copolymer formed from a polyester and polyamide.

5. The composition of claim 1, wherein the impact modifier is a polyurethane formed from a polyester.

6. A heat-curable epoxy resin composition, comprising:
   a) a glycidyl epoxy resin; and
   b) a polyester impact modifier, consisting of:
      1) at least one acid residue selected from the group consisting of: a dimer fatty acid and a non-dimeric fatty acid; and
      2) at least one diol residue selected from the group consisting of: a polyol having a molecular weight of between 50 and 200 and a dimer fatty diol;
      provided that the polyester impact modifier contains a residue from at least one of the following: the dimer fatty acid, the dimer fatty diol, or both;
   wherein:
   i) the composition phase separates upon curing to form phase-separated domains and/or particles comprising the impact modifier; and
   ii) the weight ratio of epoxy resin:impact modifier is in the range from 1.5 to 20:1.

7. The composition of claim 6, wherein the polyester is formed from dimer fatty acids, adipic acid, and at least one diol having a molecular weight in the range from 50 to 200.

8. The composition of claim 6, wherein the impact modifier comprises in the range from 15 to 50% by weight of dimer fatty acid and/or dimer fatty diol residues.

9. The composition of claim 6, wherein the weight ratio of epoxy resin:impact modifier is in the range from 1.5 to 10:1.

10. The composition of claim 6, comprising in the range from 10 to 50% by weight of impact modifier.

11. The composition of claim 6, comprising in the range from 4 to 20% by weight of dimer fatty acid and/or dimer fatty diol residues.

12. The composition of claim 6, comprising a reaction product of an epoxy resin and a prepolymer wherein the prepolymer comprises the reaction product of an epoxy resin and the oligomeric and/or polymeric impact modifier.

13. The composition of claim 12, wherein the prepolymer comprises in the range from 20 to 60% by weight of impact modifier.

14. The composition of claim 6, wherein said polyols comprise: pentaerythritol; glycerol; trimethylolpropane; ethylene glycol; diethylene glycol; 1,3-propylene glycol; dipropylene glycol; 1,4-butylene glycol; 1,6-hexylene glycol; neopentyl glycol; 3-methyl pentane glycol; 1,2-propylene glycol; 1,4-bis(hydroxymethyl)cyclohexane; or (1,4-cyclohexane-dimethanol).

15. The composition of claim 14, wherein said polyols comprise: ethylene glycol; diethylene glycol; 1,4-butylene glycol; 1,6-hexylene glycol; or neopentyl glycol.

16. The composition of claim 14, wherein said polyols comprise: 1,4-butylene glycol; 1,6-hexylene glycol; or neopentyl glycol.

17. The composition of claim 14, wherein the polyester is formed from dimer fatty acids and adipic acid.

18. The composition of claim 17, wherein said polyester comprises polyol residues derived from polyols selected from the group consisting of 1,4-butylene glycol, 1,6-hexylene glycol and neopentyl glycol.

19. The composition of claim 6, wherein the polyester impact modifier comprises a ratio of dimer fatty acid residues to non-dimeric fatty acid residues in the range from 30 to 70%:30 to 70% by weight of the total dicarboxylic acids.

20. The composition of claim 19, wherein the impact modifier is formed from dimer fatty acids, adipic acid, and at least one diol having a molecular weight in the range from 50 to 200.

21. The composition of claim 20, wherein said polyester comprises polyol residues derived from polyols selected from the group consisting of 1,4-butylene glycol, 1,6-hexylene glycol and neopentyl glycol.

22. A heat-curable electronic assembly adhesive composition comprising the heat-curable epoxy resin composition according to claim 6.

23. A method of forming a heat-curable epoxy resin composition comprising the heat-curable epoxy resin composition according to claim 6, wherein the method comprises:
    a) reacting the impact modifier with a first epoxy resin to form a prepolymer, and
    b) mixing the prepolymer with a second epoxy resin.

24. The method of claim 23, wherein the molecular weight of the first epoxy resin is less than the molecular weight of the second epoxy resin.

25. A method of assembling components, comprising:
    a) interposing a heat-curable epoxy resin adhesive composition between respective surfaces of the components; and
    b) curing said composition with the components in contact therewith, said adhesive composition comprising the heat-curable epoxy resin composition according to claim 6.

26. A cured epoxy resin composition comprising a reaction product of:
    a) a glycidyl epoxy resin; and
    b) an impact modifier that is selected from the group consisting of: a polyesteramide, a copolymer formed from a polyester and polyamide, a polyurethane, or a polyurethane formed from a polyester;
wherein:
    i) the ester-containing portion of the impact modifier consists of:
        1) at least one acid residue selected from the group consisting of: a dimer fatty acid and a non-dimeric fatty acid; and
        2) at least one diol residue selected from the group consisting of: a polyol having molecular weight of between 50 and 200 and a dimer fatty diol;
        provided that the ester-containing portion of the impact modifier contains a residue from at least one of the following: the dimer fatty acid, the dimer fatty diol, or both;
    ii) the cured resin composition comprises phase-separated domains and/or particles comprising the impact modifier; and
    iii) the weight ratio of epoxy resin:impact modifier is in the range from 1.5 to 20:1.

27. The composition of claim 26, wherein the impact modifier is a polyurethane.

28. The composition of claim 26, wherein the impact modifier is a polyesteramide, a copolymer formed from a polyester and polyamide, or a polyurethane formed from a polyester.

29. A cured epoxy resin composition comprising a reaction product of:
    a) a glycidyl epoxy resin; and
    b) a polyester impact modifier, consisting of:
        1) at least one acid residue selected from the group consisting of: a dimer fatty acid and a non-dimeric fatty acid; and
        2) at least one diol residue selected from the group consisting of: a polyol having a molecular weight of between 50 and 200 and a dimer fatty diol;
        provided that the polyester impact modifier contains a residue from at least one of the following: the dimer fatty acid, the dimer fatty diol, or both;
wherein:
    i) said composition comprises phase-separated domains and/or particles comprising the impact modifier; and
    ii) the weight ratio of epoxy resin:impact modifier is in the range from 1.5 to 20:1.

30. The composition of claim 29, wherein the domains and/or particles have a mean particle diameter in the range from 0.4 to 7 µm.

31. The composition of claim 29, wherein the domains and/or particles have a mean aspect ratio in the range from 0.6 to 1.4:1.

32. The composition of claim 29, wherein less than 25% by number of domains and/or particles have a particle diameter of less than 0.5 µm.

33. The composition of claim 29, wherein less than 20% by number of domains and/or particles have a particle diameter of greater than 5 µm.

34. The composition of claim 29, wherein the interfacial work of adhesion (Ga) is greater than 70 $Jm^{-2}$.

35. The composition of claim 29, wherein the essential work of fracture is in the range from 12 to 18 $kJm^{-2}$.

36. The composition of claim 29, wherein the domains and/or particles have an aspect ratio in the range from 0.7 to 1.3:1 and a mean particle diameter in the range from 0.8 to 5 µm.

37. The composition of claim 36, wherein at least 60% by number of the domains and/or particles have a particle diameter in the range from 0.8 to 5 µm.

38. The composition of claim 36, wherein less than 25% by number of domains and/or particles have a particle diameter of less than 0.5 µm.

39. The composition of claim 36, wherein less than 20% by number of domains and/or particles have a particle diameter of greater than 5 μm.

40. The composition of claim 29, wherein said polyols comprise: pentaerythritol; glycerol; trimethylolpropane; ethylene glycol; diethylene glycol; 1,3-propylene glycol; dipropylene glycol; 1,4-butylene glycol; 1,6-hexylene glycol; neopentyl glycol; 3-methyl pentane glycol; 1,2-propylene glycol; 1,4-bis(hydroxymethyl)cyclohexane; or (1,4-cyclohexane-dimethanol).

41. The composition of claim 40, wherein said polyols comprise: ethylene glycol; diethylene glycol; 1,4-butylene glycol; 1,6-hexylene glycol; or neopentyl glycol.

42. The composition of claim 40, wherein said polyols comprise: 1,4-butylene glycol; 1,6-hexylene glycol; or neopentyl glycol.

43. A circuit board comprising a chip or die bonded by the cured epoxy resin composition according to claim 29.

44. A prepolymer comprising a reaction product of:
a) 40 to 80 wt. % of an epoxy resin; and
b) 20 to 60 wt. % of a polyester impact modifier, consisting of:
  1) at least one acid residue selected from the group consisting of: a dimer fatty acid and a non-dimeric fatty acid; and
  2) at least one diol residue selected from the group consisting of: a polyol having a molecular weight of between 50 and 200 and a dimer fatty diol;
provided that the polyester impact modifier contains in the range of 15 to 50 wt. % of a residue from at least one of the following: the dimer fatty acid, the dimer fatty diol, or both.

* * * * *

UNITED STATES PATENT AND TRADEMARK OFFICE
CERTIFICATE OF CORRECTION

| | | |
|---|---|---|
| PATENT NO. | : 8,658,723 B2 | Page 1 of 1 |
| APPLICATION NO. | : 10/522571 | |
| DATED | : February 25, 2014 | |
| INVENTOR(S) | : Eric Appelman et al. | |

It is certified that error appears in the above-identified patent and that said Letters Patent is hereby corrected as shown below:

In the Claims

Claim 1, Column 10, line 14, "a residue from a dimer fatty diol; or" should be deleted.

Signed and Sealed this
Twenty-fourth Day of June, 2014

Michelle K. Lee
*Deputy Director of the United States Patent and Trademark Office*